(12) United States Patent
Singh et al.

(10) Patent No.: US 12,134,340 B2
(45) Date of Patent: Nov. 5, 2024

(54) VEHICLE INCLUDING LOAD-ASSIST ROLLER

(71) Applicant: Ford Global Technologies, LLC, Dearborn, MI (US)

(72) Inventors: Daveanand Singh, Arlington, VA (US); Ryan Mathew Sandor, North Wales, PA (US); Michael John Harmon, Northville, MI (US); Hussain Tajmahal, Detroit, MI (US); Scott C. Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 17/673,930

(22) Filed: Feb. 17, 2022

(65) Prior Publication Data
US 2023/0256886 A1    Aug. 17, 2023

(51) Int. Cl.
*B60P 1/52*     (2006.01)
*B60P 1/00*     (2006.01)
*B62D 33/027*   (2006.01)

(52) U.S. Cl.
CPC ............... *B60P 1/52* (2013.01); *B60P 1/003* (2013.01); *B62D 33/0273* (2013.01)

(58) Field of Classification Search
CPC ......... B60P 1/003; B60P 1/52; B62D 33/0273
USPC ..................... 414/522, 529, 532–534, 559
See application file for complete search history.

(56) References Cited

U.S. PATENT DOCUMENTS

| | | | | |
|---|---|---|---|---|
| 2,305,762 A | * | 12/1942 | Cristofoletti et al. | B60P 1/52 414/538 |
| 2,468,925 A | * | 5/1949 | De Boer | A61G 21/00 193/35 SS |
| 3,900,118 A | * | 8/1975 | Kellogg | B62D 33/0273 296/57.1 |
| 3,961,715 A | * | 6/1976 | Ellen | B60R 5/00 296/16 |
| 4,212,581 A | * | 7/1980 | Pierce | B60P 1/52 414/559 |
| 5,082,417 A | * | 1/1992 | Vlaanderen | B60P 1/6463 414/501 |
| 5,810,546 A | * | 9/1998 | Schmoling | B60P 3/1066 114/344 |
| 6,149,219 A | * | 11/2000 | Schambre | B62D 33/0273 296/26.11 |

(Continued)

FOREIGN PATENT DOCUMENTS

EP   0838372 A1    4/1998
KP   19990019644 U   6/1999

OTHER PUBLICATIONS

Rhino Kammbar Rear Roller System—KR5 £109.72 £91.43 ex VAT was: £121.91. Rhino KammBar Rear Roller System—KR5. (n.d.). Retrieved Jan. 20, 2022, from https://gttowing.co.uk/product/rhino-kammbar-rear-roller-system--kr5/.

*Primary Examiner* — James Keenan
(74) *Attorney, Agent, or Firm* — Vichit Chea; Carlson, Gaskey & Olds, P.C.

(57) ABSTRACT

This disclosure relates to a motor vehicle including a load-assist roller. In some aspects, the techniques described herein relate to a motor vehicle, including a panel and a roller moveable between a stowed position and a deployed position. When the roller is in the deployed position, the roller projects rearward of a rear edge of the panel.

18 Claims, 7 Drawing Sheets

(56) References Cited

U.S. PATENT DOCUMENTS

| | | | |
|---|---|---|---|
| 6,210,096 B1 * | 4/2001 | Fielder | B60P 3/1058 |
| | | | 414/522 |
| 6,357,991 B1 * | 3/2002 | Hamlett | B60P 3/1058 |
| | | | 414/478 |
| 7,699,373 B2 * | 4/2010 | Miller | B60P 3/40 |
| | | | 296/50 |
| 10,207,622 B2 | 2/2019 | Sedmina et al. | |
| 2013/0094931 A1 * | 4/2013 | Bluhm | B60P 1/431 |
| | | | 414/523 |
| 2013/0266412 A1 | 10/2013 | Young | |

* cited by examiner

VEHICLE INCLUDING LOAD-ASSIST ROLLER

TECHNICAL FIELD

This disclosure relates to a motor vehicle including a load-assist roller.

BACKGROUND

Some vehicles, such as pickup trucks, include a cargo bed. The cargo bed can be located behind a passenger compartment of the vehicle. A tailgate can enclose a rear, or aft, end of the cargo bed. Users use cargo beds to carry various types of loads and/or cargo.

SUMMARY

In some aspects, the techniques described herein relate to a motor vehicle, including: a panel; and a roller moveable between a stowed position and a deployed position, wherein, when in the deployed position, the roller projects rearward of a rear edge of the panel.

In some aspects, the techniques described herein relate to a motor vehicle, wherein, when in the stowed position, the roller is beneath an upper surface of the panel.

In some aspects, the techniques described herein relate to a motor vehicle, wherein the panel is a floor panel of a cargo bed.

In some aspects, the techniques described herein relate to a motor vehicle, further including: a first arm including a first end and a second end, wherein the first arm is connected to the floor panel adjacent the first end and is connected to the roller adjacent the second end; and a second arm including a first end and a second end, wherein the second arm is connected to the floor panel adjacent the first end and is connected to the roller adjacent the second end.

In some aspects, the techniques described herein relate to a motor vehicle, wherein second ends of the first and second arms are mounted to the roller to permit rotation of the roller about a longitudinal axis of the roller.

In some aspects, the techniques described herein relate to a motor vehicle, wherein the roller is configured to freely rotate about the longitudinal axis of the roller.

In some aspects, the techniques described herein relate to a motor vehicle, wherein first ends of the first and second arms are rotatably mounted about a pivot axis, and wherein the roller is configured to pivot about the pivot axis when moving between the deployed and stowed positions.

In some aspects, the techniques described herein relate to a motor vehicle, wherein, when the roller is in the stowed position, the longitudinal axis of the roller is forward of the pivot axis.

In some aspects, the techniques described herein relate to a motor vehicle, wherein, when the roller is in the stowed position, the roller is at least partially received in a recess formed in a bottom surface of the floor panel.

In some aspects, the techniques described herein relate to a motor vehicle, wherein, when the roller is in the deployed position, the longitudinal axis of the roller is rearward of the pivot axis.

In some aspects, the techniques described herein relate to a motor vehicle, wherein: the roller exhibits a length between a first end and a second end, the length is substantially equal to a length of the rear edge of the panel.

In some aspects, the techniques described herein relate to a motor vehicle, wherein: the panel is a floor panel of a cargo bed, the floor panel is moveable between a standard floor position and an extended floor position, and the roller is only moveable from the deployed position to the stowed position when the floor panel is in the extended floor position.

In some aspects, the techniques described herein relate to a motor vehicle, further including a tailgate adjacent a rear of the cargo bed, wherein: the tailgate is a split tailgate including a first door and a second door, the first door is configured to pivot about a first vertically-extending axis between a closed position and a fully open position, the second door is configured to pivot about a second vertically-extending axis between a closed position and a fully open position, the first vertically-extending axis is adjacent an opposite side of the cargo bed as the second vertically-extending axis, and when the first and second doors are in respective fully open positions, the floor panel is moveable to the extended floor position.

In some aspects, the techniques described herein relate to a motor vehicle, further including a winch configured to pull a load into a cargo bed.

In some aspects, the techniques described herein relate to a motor vehicle, wherein the motor vehicle is a pickup truck.

In some aspects, the techniques described herein relate to a motor vehicle, including: a floor panel of a cargo bed, wherein the floor panel is moveable between a standard floor position and an extended floor position; and a tailgate adjacent a rear of the cargo bed, wherein the tailgate is a split tailgate including a first door and a second door, wherein the first and second doors are each moveable between closed positions and fully open positions about respective first and second vertically-extending axes; and a roller, wherein, when the floor panel is in the extended position and the first and second doors are in the fully open position, the roller is moveable from a stowed position to a deployed position in which the roller projects rearward of a rear edge of the floor panel.

In some aspects, the techniques described herein relate to a motor vehicle, wherein, when in the stowed position, the roller is beneath an upper surface of the floor panel.

In some aspects, the techniques described herein relate to a motor vehicle, wherein the roller is only moveable from the deployed position to the stowed position when the floor panel is in the extended floor position and when the first and second doors are in the fully open positions.

In some aspects, the techniques described herein relate to a motor vehicle, further including: a first arm including a first end and a second end, wherein the first arm is connected to the floor panel adjacent the first end and is connected to the roller adjacent the second end; and a second arm including a first end and a second end, wherein the second arm is connected to the floor panel adjacent the first end and is connected to the roller adjacent the second end, wherein: second ends of the first and second arms are mounted to the roller to permit rotation of the roller about a longitudinal axis of the roller, first ends of the first and second arms are rotatably mounted about a pivot axis, the roller is configured to pivot about the pivot axis when moving between the deployed and stowed positions, when the roller is in the stowed position, the longitudinal axis of the roller is forward of the pivot axis, when the roller is in the stowed position, the roller is at least partially received in a recess formed in a bottom surface of the floor panel.

In some aspects, the techniques described herein relate to a method, including: moving a roller from a stowed position to a deployed position, wherein, when in the deployed position, the roller projects rearward of a rear edge of a panel of a motor vehicle; moving a load into or out of a cargo bed of the motor vehicle while allowing the load to contact the roller.

BRIEF DESCRIPTION OF THE DRAWINGS

In FIG. 1, a tailgate of the vehicle is in a closed position.

DETAILED DESCRIPTION

This disclosure relates to a motor vehicle including a load-assist roller. Among other benefits, this disclosure facilitates loading and unloading of a cargo bed of the vehicle, and also provides easy access to the load-assist roller and convenient storage of the roller when not in use. These and other benefits will be appreciated from the following description.

Figure 1:
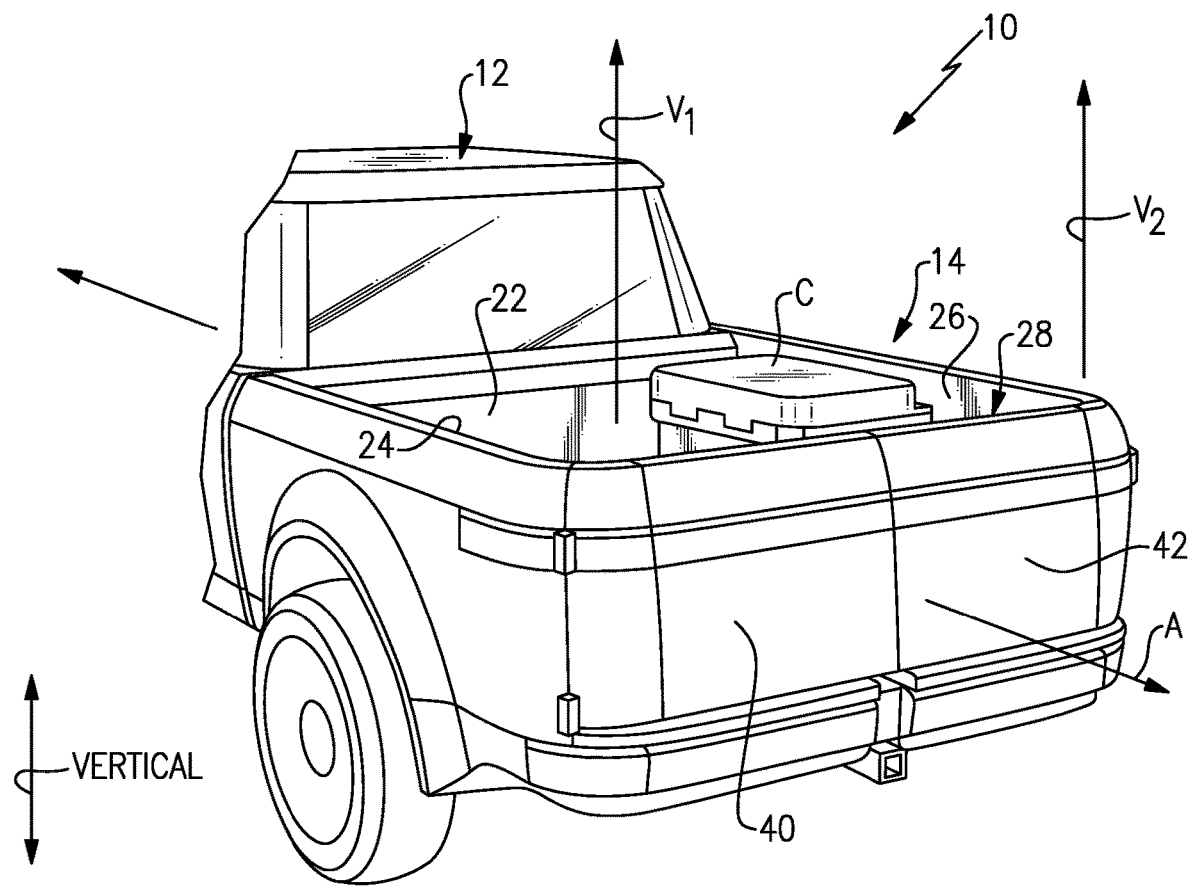
FIG. 1 is a rear-perspective view of a portion of a motor vehicle, which in this example is a pickup truck.

FIG. 1 illustrates a portion of a motor vehicle 10 ("vehicle 10"), which in this example is a pickup truck. While beneficial in the context of pickup trucks, this disclosure could extend to other vehicles besides pickup trucks, such as sport utility vehicles (SUVs), cars, vans, etc. The vehicle 10 can have either a unibody architecture or a body-on-frame architecture, as examples. The vehicle 10 can be an electrified vehicle such as a battery electric vehicle (BEV), plug-in hybrid electric vehicle (PHEV). Alternatively, the vehicle 10 could be a conventional vehicle powered solely or primarily by an internal combustion engine.

The vehicle 10 includes a passenger cabin 12 and, rearward of the passenger cabin 12, a cargo bed 14. The cargo bed 14 is an open-topped cargo area in this example. In other examples, the cargo bed 14 can be closed by a moveable cover, such as a tonneau cover, or a fixed cover, such as a truck cap.

FIG. 1 shows the cargo bed 14 in a standard position where the cargo bed 14 can hold loads such as cargo C. FIG. 3 also shows the cargo bed 14 in the standard position. The cargo bed 14 can be transitioned from the standard bed position of FIGS. 1 and 3 to an extended bed position, shown in FIG. 2. Generally, the cargo bed 14 includes a floor assembly 20 (FIG. 2), a front wall 22, a first side wall 24, a second side wall 26, and a tailgate assembly 28. The tailgate assembly 28 may be referred to simply as a tailgate.

Figure 2:
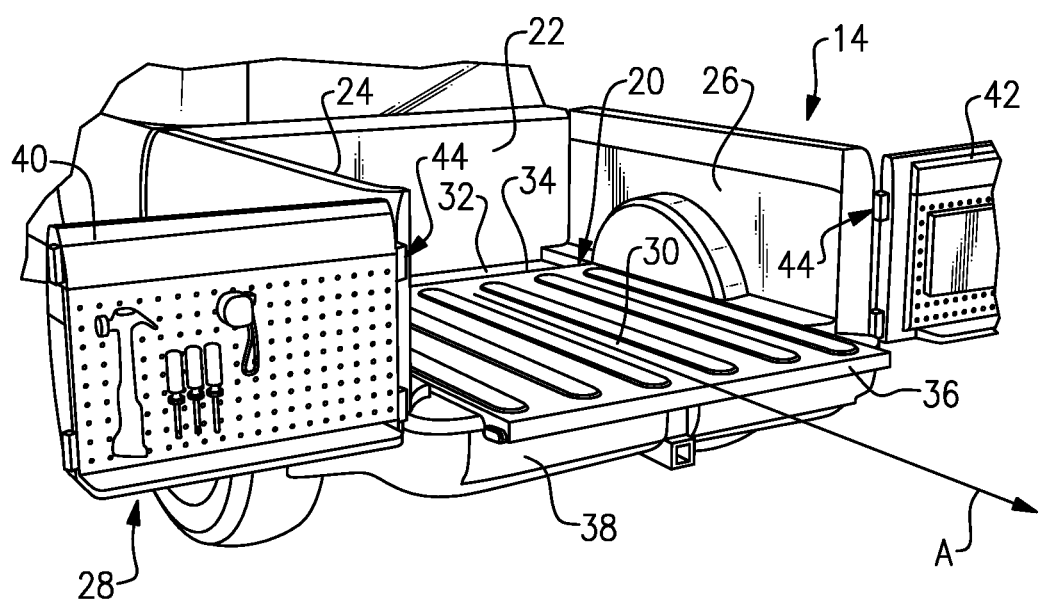
FIG. 2 is another rear-perspective view of a portion of the vehicle, and in particular shows the tailgate in an open position and a cargo bed in an extended position.
Figure 3:
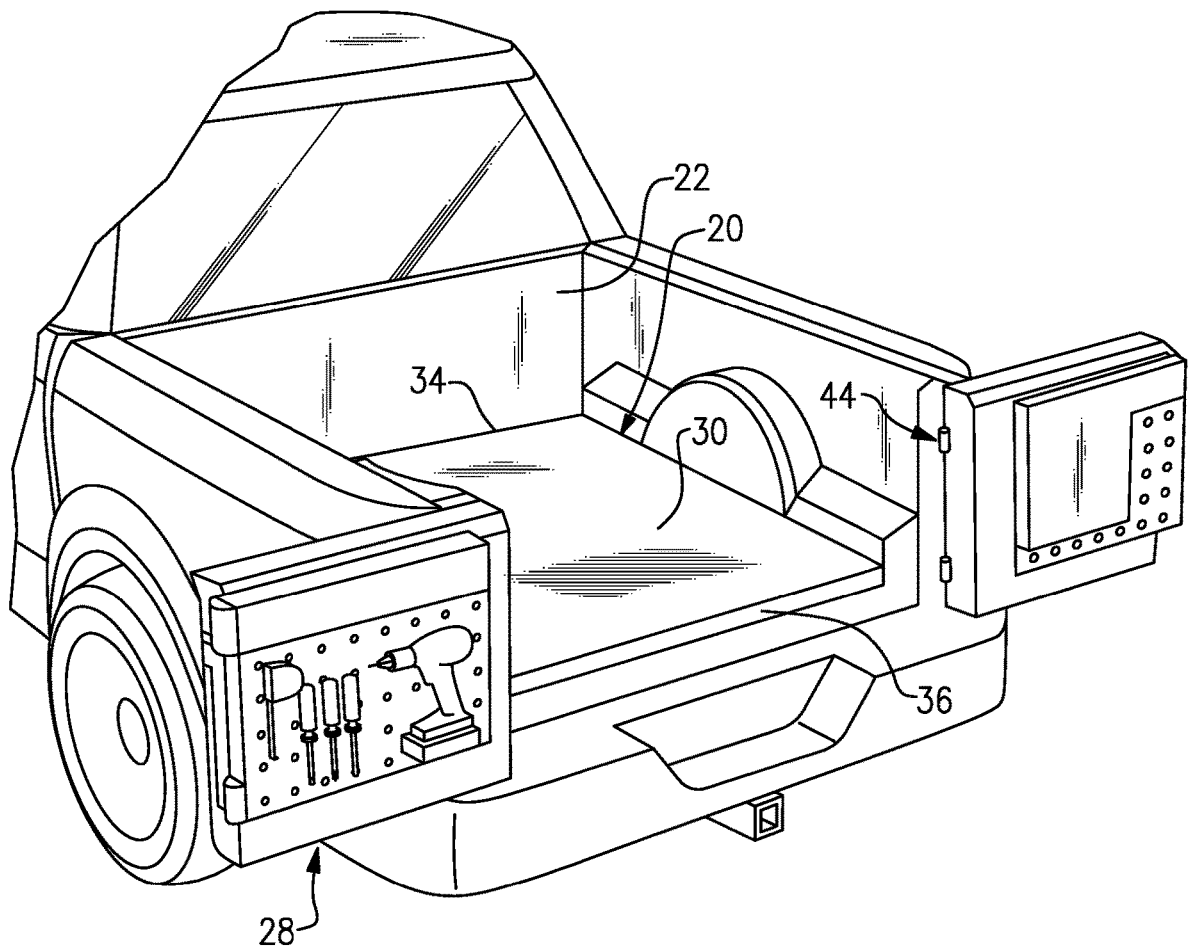
FIG. 3 is a view similar to FIG. 2, and in particular shows the tailgate in an open position and the cargo bed in a standard position.

The floor assembly 20 is part of a cargo bed system that enables the cargo bed 14 to be transitioned back-and-forth between the standard bed position of FIG. 1 and the extended bed position of FIG. 2. When the cargo bed 14 is in the standard bed position, the floor assembly 20 is in a standard floor position. When the cargo bed 14 is in the extended bed position, the floor assembly 20 is in an extended floor position.

With reference to FIGS. 2 and 3, the floor assembly 20 includes a floor panel 30 slidable in a back-and-forth direction parallel to a centerline line axis A of the vehicle 10 relative to a floor frame 32. As shown in FIG. 3, when the cargo bed 14 is in the standard bed position, a front edge 34 of the floor panel 30 directly contacts the front wall 22. In FIG. 2, when the cargo bed 14 is in the extended bed position, the floor panel 30 is slid rearward relative to its position in FIG. 3 such that the front edge 34 is spaced-apart rearward of the front wall 22. Further, in this example, in the extended bed position a rear edge 36 of the floor panel 30 projects rearward of a rear bumper 38 of the vehicle 10. While a slidable floor panel 30 is discussed herein, the floor panel 30 could be moveable in another manner, such as being pivotable in addition to or as an alternative to sliding.

With reference to FIGS. 1-3, the tailgate assembly 28 of the vehicle 10 is a split tailgate having a first door 40 and a second door 42. The first door 40 is configured to pivot about a first vertically extending axis $V_1$ back-and-forth between a closed position (FIG. 1) and a fully open position (FIGS. 2 and 3). The second door 42 is also configured to pivot about a second vertically extending axis $V_2$ back-and-forth between a closed position (FIG. 1) and a fully open position (FIGS. 2 and 3). In this example, the first door 40 and second door 42 are similarly-sized. The first door 40 and the second door 42 each account for about fifty percent of the length of the tailgate assembly 28.

FIGS. 2 and 3 show the first and second doors 40, 42 in respective fully open positions. Door hinge assemblies 44 can be used, for example, to pivotably connect the first and second doors 40, 42 to the surrounding structures to enable the first and second doors 40, 42 to pivot back-and-forth between the closed position of FIG. 1 and the fully open positions of FIGS. 2 and 3. When the first door 40 and the second door 42 are in their respective fully open positions, the floor assembly 20 can be moved to the extended floor position, as shown in FIG. 2. Tools, accessories, gear, etc., can be mounted on the first door 40 and the second door 42, as shown.

An aspect of this disclosure relates to an assembly 46 (FIG. 4) configured to assist with loading the cargo bed 14. The assembly 46 includes a roller 48 moveable between a deployed position (FIG. 4) and a stowed position (FIG. 5). When in the deployed position, the roller 48 is configured to roll to assist a user with moving loads and/or cargo into and out of the cargo bed 14.

The roller 48 includes a cylindrical body which is configured to rotate about the longitudinal axis L. In a particular example, the roller 48 is configured rotate freely about the longitudinal axis L in either a clockwise or a counterclockwise. The roller 48 exhibits a length along the longitudinal axis L substantially equal to a length of the rear edge 36 of the floor panel 30. The roller 48 may be fully or partially hollow. The roller 48 may be made of a metallic, plastic, or rubber material, or combinations thereof. At ends thereof, the roller 48 is mounted to mounts 50, 52. The mounts 50, 52 permit the roller 48 to rotate about the longitudinal axis L in response to frictional forces being applied to the roller 48. The mounts 50, 52 and/or the roller 48 may include bearings to facilitate rotation of the roller 48 about the longitudinal axis L. Alternatively, the roller 48 may include a central, static rod running along an entire length of the roller 48 and an outer sleeve configured to rotate relative to the rod.

While in one example the roller 48 is configured to rotate freely about the longitudinal axis L, in another example movement of the roller 48 is governed by a ratchet assembly. The ratchet assembly may be incorporated into one or both of the mounts 50, 52. The ratchet assembly is selectively configurable between three modes, in one example. The three modes include a first mode in which free spinning of the roller 48 is permitted, a second mode in which the roller 48 is rotatable about the longitudinal axis L in a first direction only (such as a clockwise direction only), and a third mode in which the roller 48 is rotatable about the longitudinal axis L in a second direction only (such as a counterclockwise direction only). The second direction is opposite the first direction. Setting the ratchet assembly to one of the second or third modes may facilitate loading or unloading of a load from the cargo bed 14 because the ratchet assembly can cause the roller 48 to resist rotation in a direction opposite the direction of intended movement of the load. For instance, if loading the cargo bed 14, the ratchet assembly can be set such that the roller 48 resists rearward movement of the load.

In this example, to facilitate movement of the roller 48 between deployed and stowed positions, the mounts 50, 52 are attached to first and second arms, respectively. Only a first arm 54 is visible in FIG. 4. A corresponding second arm is arranged on an opposite side of the roller 48 and the second arm is arranged substantially similar to first arm 54.

The first arm 54 includes a first end 56 and a second end 58. The first arm 54 is connected to the floor panel 30 adjacent the first end 56 and is connected to the roller 48, via the mount 50, adjacent the second end 58. While mounts 50, 52 are shown, they are not required in all examples. For instance, the first arm 54 and second arm could perform some or all of the functions of the mount 50. While arms and mounts are mentioned, this disclosure extends to other arrangements in which the roller 48 is able to rotate while also being pivotable between deployed and stowed positions.

The first end 56 of the first arm 54 is rotatably mounted adjacent a side 60 of the floor panel 30 about a pivot axis P. The pivot axis P is adjacent an underside 62 of the floor panel 30 in this example. The roller 48, first and second mounts 50, 52, first arm 54, and second arm are configured to pivot about the pivot axis P to move the roller 48 between the deployed and stowed positions.

Figure 5:
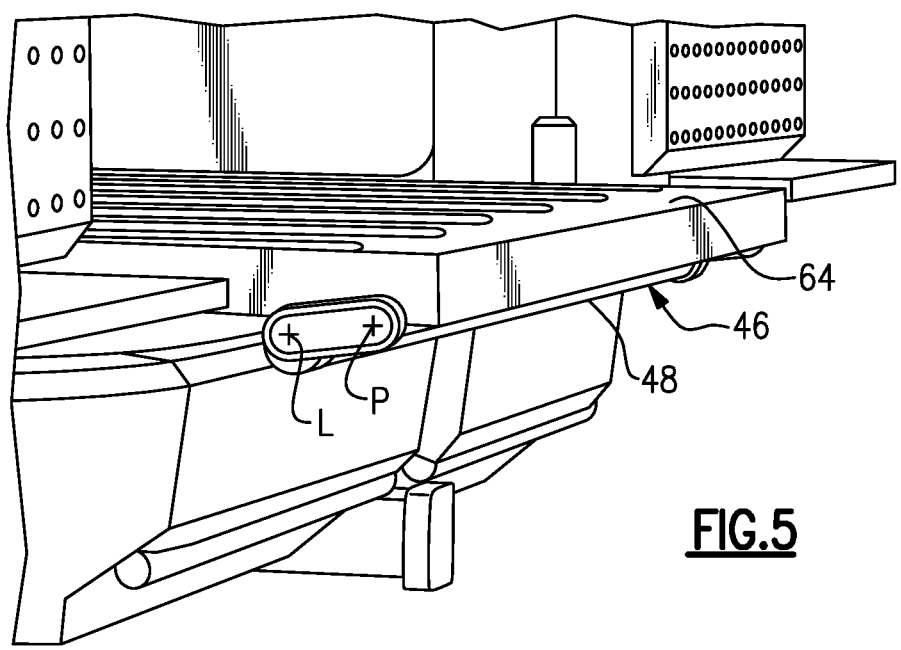
FIG. 5 is a view similar to FIG. 4 and illustrates the load-assist roller in a stowed position.
Figure 6:
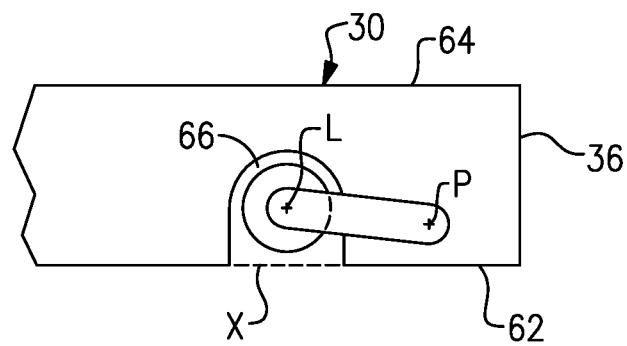
FIG. 6 is another exemplary view of the load-assist roller in a stowed position.

With reference to FIGS. 5 and 6, when the roller 48 is in the stowed position, the roller 48 is beneath an upper surface 64 of the floor panel 30. In a particular example, as shown in FIG. 6, a recess 66 formed in the underside 62 fully receives the entire roller 48 when the roller 48 is in the stowed position. Specifically, the entirety of the roller 48 is vertically above a plane X containing the underside 62. In this way, the roller 48 does not interfere with sliding of the floor panel 30 relative to the floor frame 32. When the roller 48 is in the stowed position, the longitudinal axis L of the roller is forward of the pivot axis P.

Figure 4:
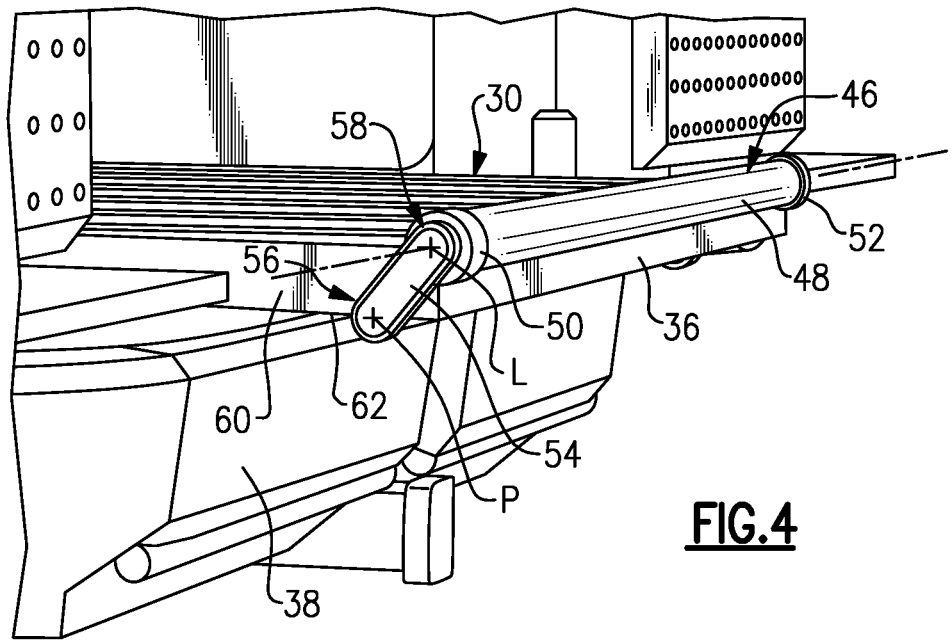
FIG. 4 is a close-up view of a load-assist roller in a deployed position.

With reference to FIG. 4, when the roller 48 is in the deployed position, the roller 48 projects rearward of a rear edge 36 of the floor panel 30. Specifically, a rear-most part of the roller 48 projects rearward of the rear edge 36. Further, the roller 48 projects rearward of the rear bumper 38. As such, as a user brings a load/cargo toward cargo bed 14 for loading, the load is increasingly likely to contact the deployed roller 48, which is closer to the load/cargo than the rear edge 36 and the rear bumper 38. When the roller 48 is in the deployed position, the longitudinal axis L of the roller 48 is rearward of, and vertically above, the pivot axis P.

In an example of this disclosure, the roller 48 is only moveable from the deployed position to the stowed position when the floor panel 30 is in the extended floor position, and when the first and second doors are in respective fully open positions.

Figure 7:
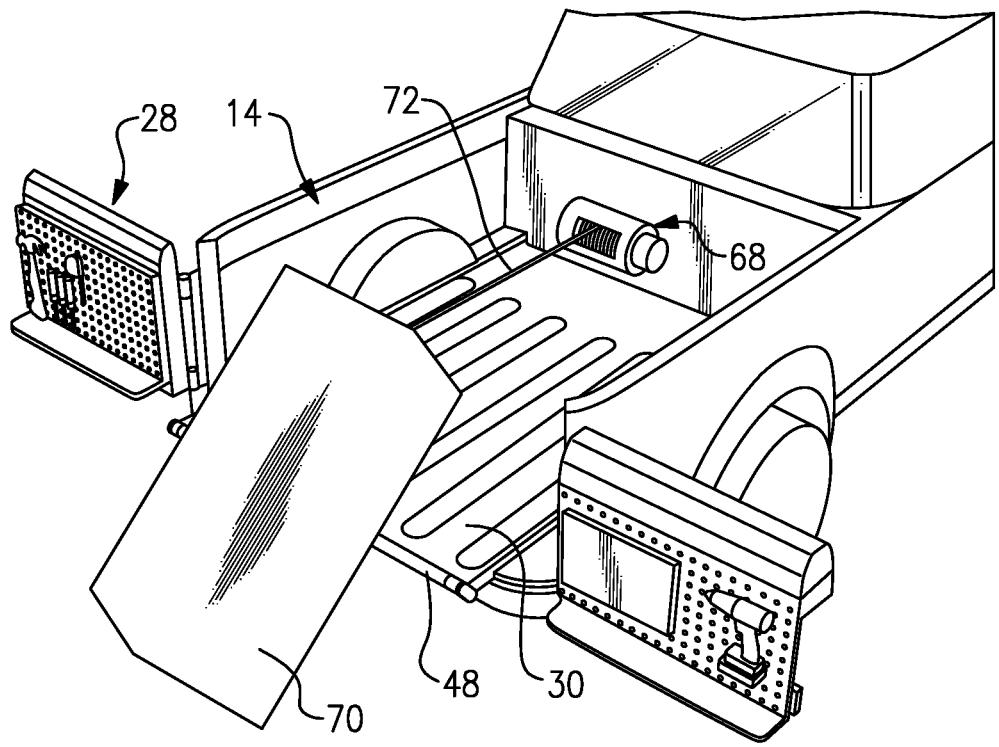
FIG. 7 is another rear-perspective view of the vehicle and in particular illustrates a load in contact with the roller. Further, in FIG. 7, a winch is connected to the load.

In one aspect of this disclosure, a winch 68 is configured to pull a load 70 into the cargo bed 14, as shown in FIG. 7. In this example, the load 70 is a relatively large and/or heavy piece of wood or other material. A user lifts the load 70 into a position in which the load 70 contacts the roller 48, which is in the deployed position in FIG. 7. The user then attaches the load to a cable 72 of the winch 68. The user then activates the winch 68 such that the cable 72 is pulled forward and into the cargo bed 14. The roller 48 facilitates movement of the load 70 into the cargo bed 14 under the force of the winch 68 as the winch 68 reels in the cable 72. When the load 70 is fully in the cargo bed 14, such as entirely lying on the floor panel 30, the user may move the roller 48 to the stowed position, push the floor panel 30 forward, and close the tailgate assembly 28. A motorized reel could replace the winch 68 in other examples.

The winch 68 may be connected to a power source and a controller. The power source could be a traction battery or another device configured to supply power. The controller could be part of an overall vehicle control module, such as a vehicle system controller (VSC), or could alternatively be a stand-alone controller separate from the VSC. Further, the controller may be programmed with executable instructions for interfacing with and operating the various components of the vehicle 10. The controller includes a processing unit and non-transitory memory for executing the various control strategies and modes of the vehicle system.

Figure 8:
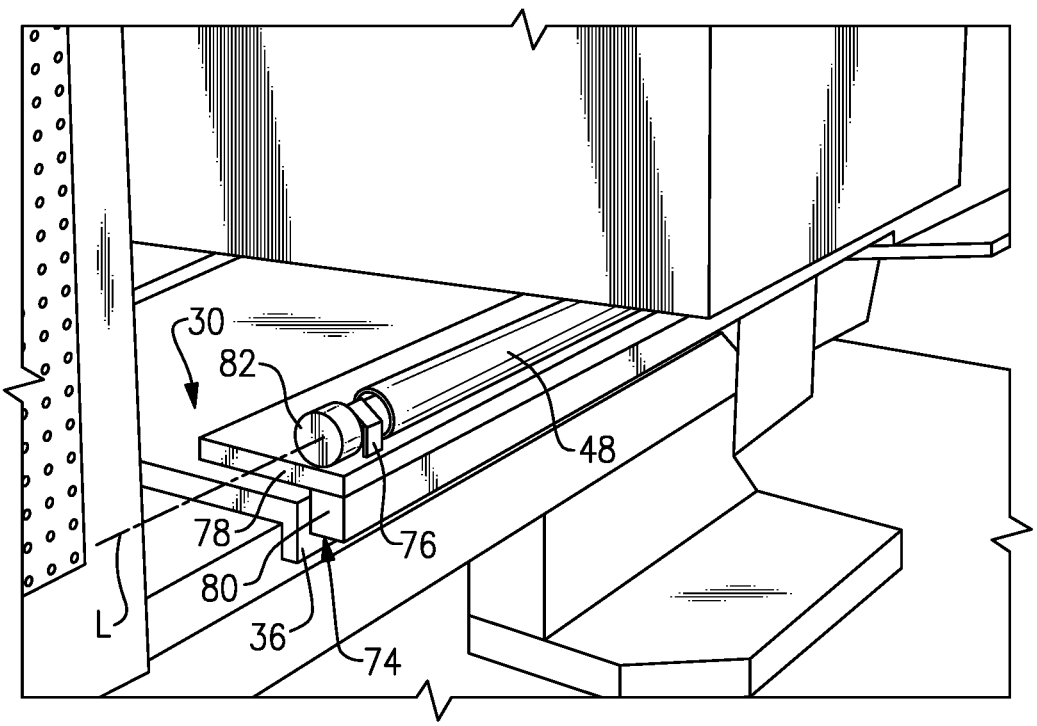
FIG. 8 is a close-up view of another example load-assist roller in a deployed position.
Figure 9:
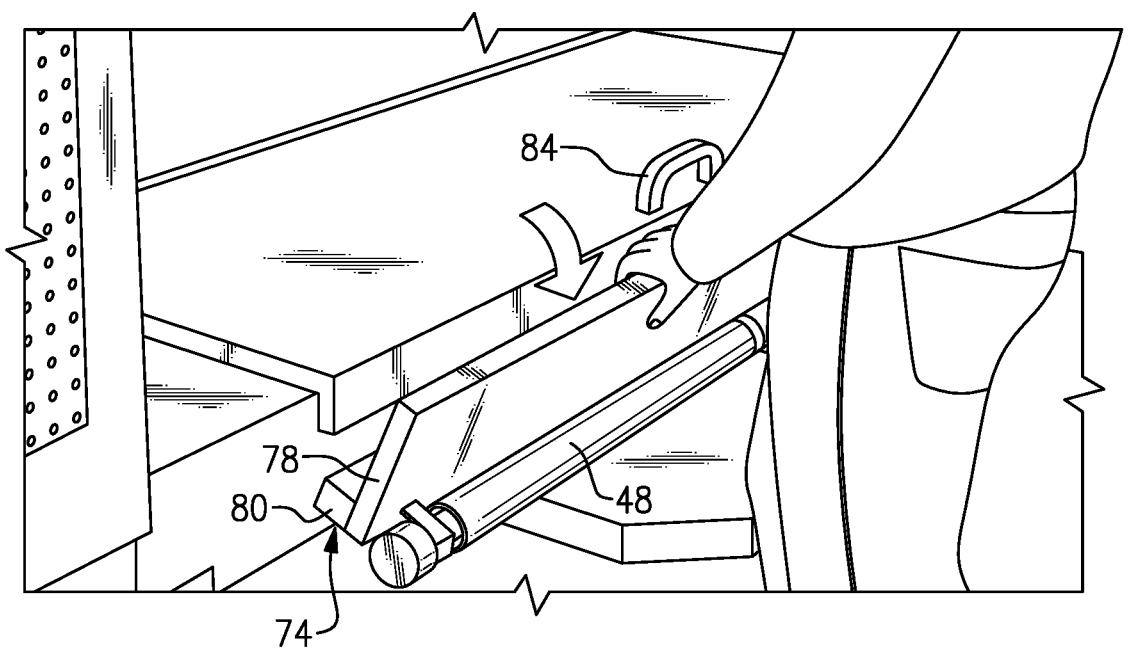
FIG. 9 is a close-up view of the example load-assist roller from FIG. 8 in an intermediate position in which the load-assist roller is moving from a deployed position to a stowed position.

Another embodiment of the roller 48 is shown in FIGS. 8 and 9. In FIG. 8, which shows the roller 48 in a deployed position, the roller 48 is mounted adjacent ends thereof to a bracket 74 via mounts 76. Only one mount 76 is shown in FIG. 8, but it should be understood that a similar mount is at an opposite end of the roller 48. The bracket 74 is L-shaped in cross-section and includes a first portion 78 projecting perpendicularly from a second portion 80. In the deployed position, the first portion 78 is vertically above the floor panel 30 and the second portion 80 is rearward of the rear edge 36. The roller 48 is mounted above to the first portion 78 via the mount 76. The mount 76 permits rotation of the roller 48 about its longitudinal axis L as in the previous embodiment(s). Caps 82 prevent movement of the roller 48 relative to the mount 76 along the longitudinal axis L. The bracket 74 is moveable between the deployed position of FIG. 8 and a stowed position. FIG. 9 illustrates the bracket 74 in an intermediate position in which the bracket 74 is moving from the deployed position to a stowed position. The bracket 74 and roller 48 may ultimately move to a stowed position below the floor panel 30. Additionally, as shown in FIG. 9, the floor panel 30 may includes a handle 84 configured to facilitate sliding of the floor panel 30 in the back-and-forth directions.

Figure 10:
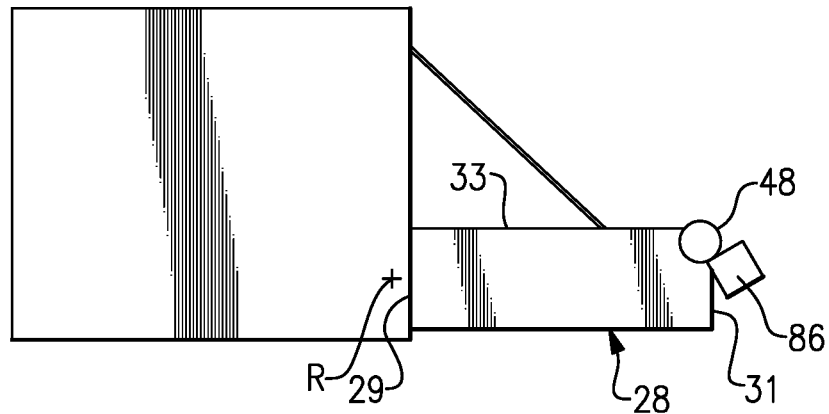
FIG. 10 is a side view of another exemplary load-assist roller arrangement.
Figure 11:
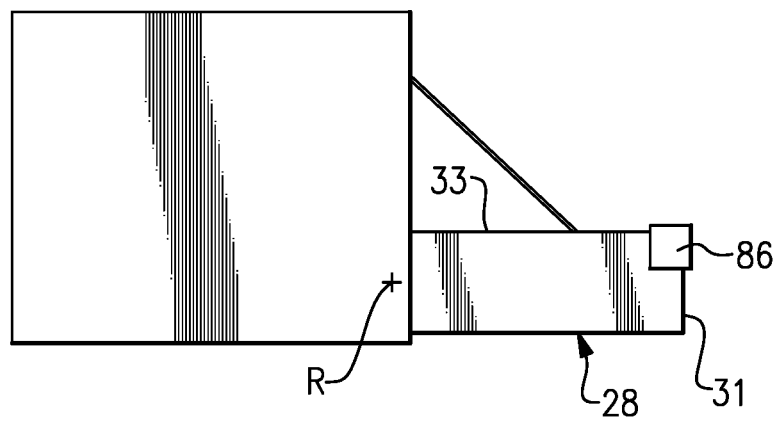
FIG. 11 is another side view of the load-assist roller arrangement of FIG. 10.

FIGS. 10 and 11 illustrate, somewhat schematically, another exemplary arrangement of a load-assist roller 48. With joint reference to FIGS. 10 and 11, whereas in the previous embodiments the tailgate 28 was a split tailgate, in this embodiment the tailgate 28 is configured to rotate about 90° between closed and open positions relative to an axis R, which is perpendicular to the centerline axis A. In the closed position, the tailgate 28 encloses the cargo bed 14 from the rear, and in the open position the cargo bed 14 is accessible from the rear. The axis R is adjacent a bottom edge 29 of the tailgate 28. When the tailgate 28 is in the open position, as in FIGS. 10 and 11, the top edge 31 of the tailgate 28 may be referred to as a rear edge. The roller 48 is mounted to the tailgate 28 such that the roller 48 projects rearward of the top edge 31 when a cover 86 is moved so as to expose the roller 48. The cover 86 is moveably mounted to the tailgate 28 and is configured to be selectively moveable to expose the roller 48, as in FIG. 10, and to cover the roller 48, as in FIG. 11. The cover 86 is not required in all examples. When present, the cover 86 may be configured to be fully stowed in the tailgate 28 such that, when the roller 48 is being used, the cover 86 does not interfere with the roller 48 and the roller 48 projects further rearward than any other structure of the tailgate 28. Further, in this example, the roller 48 projects upward of a forward surface 33 of the tailgate 28, which is a top surface when the tailgate 28 is open. When the tailgate 28 is closed, the roller 48 may be referred to as being in the stowed position, either with or without the cover 86 covering the roller 48. When the tailgate 28 is open and the cover 86 exposes the roller 48, the roller 48 may be referred to as being in the deployed position. The roller 48 functions substantially similar to the previous embodiments in that the roller 48 is rotatable relative to the tailgate 28, either freely about its longitudinal axis or with respect to a ratchet assembly, to assist with loading the cargo bed 14. The embodiments of FIGS. 10 and 11 can be used in combination with a winch.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used in the Detailed Description section for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, wherein the motor vehicle includes a front and a rear, wherein the front of the motor vehicle is forward of the rear, and the rear of the motor vehicle is rearward of the front, the motor vehicle comprising:
a panel; and
a roller moveable between a stowed position and a deployed position, wherein, when in the deployed position, the roller projects rearward of a rear edge of the panel and above an upper surface of the panel,
wherein the roller exhibits a length between a first end and a second end,
wherein the length is substantially equal to a length of the rear edge of the panel,
wherein the panel is a floor panel of a cargo bed,
wherein the floor panel is moveable between a standard floor position and an extended floor position, and
wherein the roller is only moveable from the deployed position to the stowed position when the floor panel is in the extended floor position.

2. The motor vehicle as recited in claim 1, wherein, when in the stowed position, the roller is beneath an upper surface of the panel.

3. The motor vehicle as recited in claim 2, wherein the panel is a floor panel of a cargo bed.

4. The motor vehicle as recited in claim 3, further comprising:
a first arm including a first end and a second end, wherein the first arm is connected to the floor panel adjacent the first end and is connected to the roller adjacent the second end; and
a second arm including a first end and a second end, wherein the second arm is connected to the floor panel adjacent the first end and is connected to the roller adjacent the second end.

5. The motor vehicle as recited in claim 4, wherein the second ends of the first and second arms are mounted to the roller to permit rotation of the roller about a longitudinal axis of the roller.

6. The motor vehicle as recited in claim 5, wherein the roller is configured to freely rotate about the longitudinal axis of the roller.

7. The motor vehicle as recited in claim 5, wherein the first ends of the first and second arms are rotatably mounted about a pivot axis, and wherein the roller is configured to pivot about the pivot axis when moving between the deployed and stowed positions.

8. The motor vehicle as recited in claim 1, further comprising a tailgate adjacent a rear of the cargo bed, wherein:
the tailgate is a split tailgate including a first door and a second door,
the first door is configured to pivot about a first vertically-extending axis between a closed position and a fully open position,
the second door is configured to pivot about a second vertically-extending axis between a closed position and a fully open position,
the first vertically-extending axis is adjacent an opposite side of the cargo bed as the second vertically-extending axis, and
when the first and second doors are in respective fully open positions, the floor panel is moveable to the extended floor position.

9. The motor vehicle as recited in claim 1, further comprising a winch configured to pull a load into a cargo bed.

10. The motor vehicle as recited in claim 1, wherein the motor vehicle is a pickup truck.

11. The motor vehicle as recited in claim 1, wherein the roller is rotatable about a pivot axis when moving between the stowed position and the deployed position, and wherein, when the roller is in the deployed position, a longitudinal axis of the roller is vertically above the pivot axis.

12. A motor vehicle, wherein the motor vehicle includes a front and a rear, wherein the front of the motor vehicle is forward of the rear, and the rear of the motor vehicle is rearward of the front, the motor vehicle comprising:

a panel;

a roller moveable between a stowed position and a deployed position, wherein, when in the deployed position, the roller projects rearward of a rear edge of the panel and above an upper surface of the panel;

wherein the panel is a floor panel of a cargo bed, a first arm including a first end and a second end, wherein the first arm is connected to the floor panel adjacent the first end and is connected to the roller adjacent the second end; and a second arm including a first end and a second end, wherein the second arm is connected to the floor panel adjacent the first end and is connected to the roller adjacent the second end;

wherein, when in the stowed position, the roller is beneath an upper surface of the panel, wherein the second ends of the first and second arms are mounted to the roller to permit rotation of the roller about a longitudinal axis of the roller, wherein the first ends of the first and second arms are rotatably mounted about a pivot axis, and wherein the roller is configured to pivot about the pivot axis when moving between the deployed and stowed positions, and wherein, when the roller is in the stowed position, the longitudinal axis of the roller is forward of the pivot axis.

13. The motor vehicle as recited in claim 12, wherein, when the roller is in the stowed position, the roller is at least partially received in a recess formed in a bottom surface of the floor panel.

14. The motor vehicle as recited in claim 12, wherein, when the roller is in the deployed position, the longitudinal axis of the roller is rearward of the pivot axis.

15. A motor vehicle, wherein the motor vehicle includes a front and a rear, wherein the front of the motor vehicle is forward of the rear, and the rear of the motor vehicle is rearward of the front, the motor vehicle comprising:

a floor panel of a cargo bed, wherein the floor panel is moveable between a standard floor position and an extended floor position; and a tailgate adjacent a rear of the cargo bed, wherein the tailgate is a split tailgate including a first door and a second door, wherein the first and second doors are each moveable between closed positions and fully open positions about respective first and second vertically-extending axes; and a roller, wherein, when the floor panel is in the extended position and the first and second doors are in the fully open position, the roller is moveable from a stowed position to a deployed position in which the roller projects rearward of a rear edge of the floor panel, wherein, when the roller is in the deployed position, the roller projects above an upper surface of the panel.

16. The motor vehicle as recited in claim 15, wherein, when in the stowed position, the roller is beneath an upper surface of the floor panel.

17. The motor vehicle as recited in claim 16, wherein the roller is only moveable from the deployed position to the stowed position when the floor panel is in the extended floor position and when the first and second doors are in the fully open positions.

18. The motor vehicle as recited in claim 17, further comprising:

a first arm including a first end and a second end, wherein the first arm is connected to the floor panel adjacent the first end and is connected to the roller adjacent the second end; and a second arm including a first end and a second end, wherein the second arm is connected to the floor panel adjacent the first end and is connected to the roller adjacent the second end, wherein:

second ends of the first and second arms are mounted to the roller to permit rotation of the roller about a longitudinal axis of the roller, first ends of the first and second arms are rotatably mounted about a pivot axis, the roller is configured to pivot about the pivot axis when moving between the deployed and stowed positions, when the roller is in the stowed position, the longitudinal axis of the roller is forward of the pivot axis, when the roller is in the stowed position, the roller is at least partially received in a recess formed in a bottom surface of the floor panel.

* * * * *